(12) United States Patent
Yamasaki et al.

(10) Patent No.: US 10,601,601 B2
(45) Date of Patent: Mar. 24, 2020

(54) INFORMATION PROCESSING SYSTEM, INFORMATION PROCESSING METHOD, NON-TRANSITORY STORAGE MEDIUM STORING PROGRAM, AND INFORMATION PROCESSING DEVICE

(71) Applicant: TOYOTA JIDOSHA KABUSHIKI KAISHA, Toyota-shi, Aichi-ken (JP)

(72) Inventors: Yasuhiro Yamasaki, Okazaki (JP); Toshio Kawamura, Nagakute (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 16/036,775

(22) Filed: Jul. 16, 2018

(65) Prior Publication Data
US 2019/0068391 A1 Feb. 28, 2019

(30) Foreign Application Priority Data

Aug. 29, 2017 (JP) ................................ 2017-164767

(51) Int. Cl.
| | |
|---|---|
| H04H 20/71 | (2008.01) |
| H04L 12/18 | (2006.01) |
| H04L 5/00 | (2006.01) |
| H04L 12/26 | (2006.01) |
| H04L 29/06 | (2006.01) |

(Continued)

(52) U.S. Cl.
CPC ............ *H04L 12/1868* (2013.01); *H04L 1/00* (2013.01); *H04L 1/188* (2013.01); *H04L 5/0055* (2013.01); *H04L 43/0829* (2013.01); *H04L 69/16* (2013.01); *H04L 69/166* (2013.01)

(58) Field of Classification Search
CPC ... H04L 12/1868; H04L 1/00; H04L 43/0829; H04L 5/0055; H04L 69/16; H04L 69/166
See application file for complete search history.

(56) References Cited

U.S. PATENT DOCUMENTS

| | | | |
|---|---|---|---|
| 2005/0185579 A1* | 8/2005 | Jung ..................... | H04L 1/1832 370/229 |
| 2010/0039942 A1* | 2/2010 | Nakatsuji .............. | H04W 28/06 370/241 |

(Continued)

FOREIGN PATENT DOCUMENTS

JP 2009100118 A 5/2009

OTHER PUBLICATIONS

Van Jacobson, "Congestion Avoidance and Control", Computer Communication Review, vol. 18, No. 4, pp. 157-173, Aug. 1988.

*Primary Examiner* — Minh Trang T Nguyen
(74) *Attorney, Agent, or Firm* — Hunton Andrews Kurth LLP

(57) ABSTRACT

An information processing system includes: a first information processing device including a transmission unit, the transmission unit being configured to transmit a dummy segment including dummy data, after sequentially transmitting transmission segments into which transmission data is divided; and a second information processing device configured to communicate with the first information processing device using a transmission control protocol, the second information processing device including a removal unit configured to remove the dummy segment and to set data including the transmission segments as the transmission data when the transmission segments and the dummy segment are received.

11 Claims, 6 Drawing Sheets

(51) Int. Cl.
*H04L 1/00* (2006.01)
*H04L 1/18* (2006.01)

(56) References Cited

U.S. PATENT DOCUMENTS

| | | | |
|---|---|---|---|
| 2010/0192045 A1* | 7/2010 | Park | H03M 13/2732 |
| | | | 714/784 |
| 2014/0143308 A1* | 5/2014 | Tychina | H04L 69/16 |
| | | | 709/203 |
| 2018/0351853 A1* | 12/2018 | Usui | H04W 76/15 |

* cited by examiner

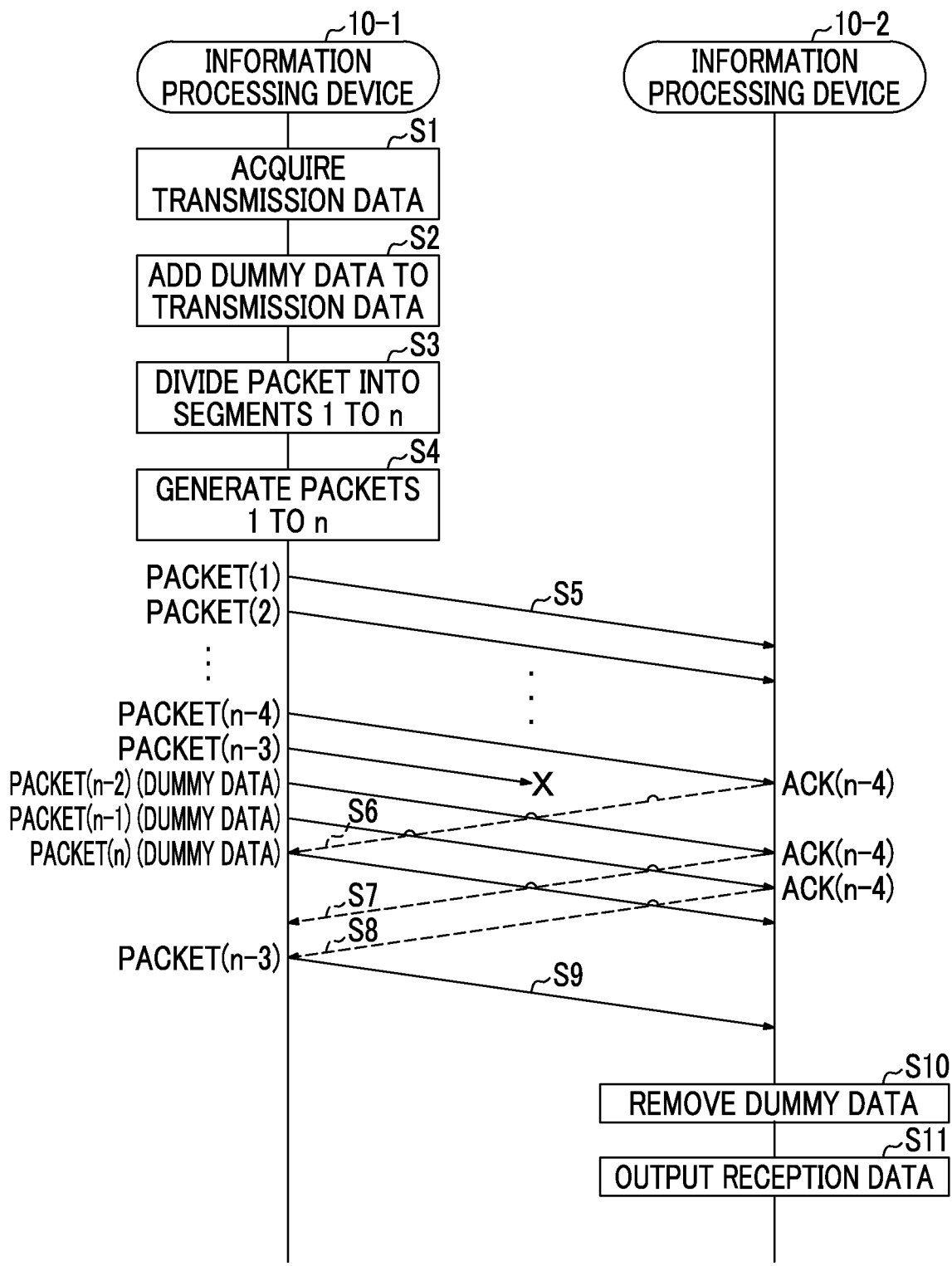

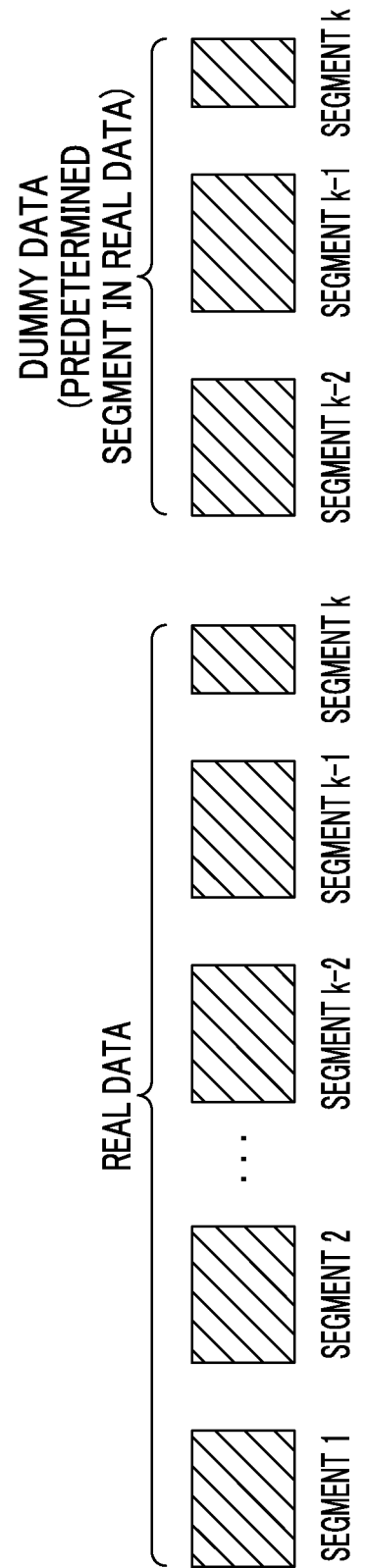

INFORMATION PROCESSING SYSTEM, INFORMATION PROCESSING METHOD, NON-TRANSITORY STORAGE MEDIUM STORING PROGRAM, AND INFORMATION PROCESSING DEVICE

INCORPORATION BY REFERENCE

The disclosure of Japanese Patent Application No. 2017-164767 filed on Aug. 29, 2017 including the specification, drawings and abstract is incorporated herein by reference in its entirety.

BACKGROUND

1. Technical Field

The disclosure relates to an information processing system, an information processing method, a non-transitory storage medium storing a program, and an information processing device.

2. Description of Related Art

A technique for performing control of resending (retransmitting) a packet transmitted from a transmission-side terminal using a communication protocol such as a transmission control protocol (TCP) when the packet is lost due to congestion or the like and is not received normally by a reception-side terminal is known (for example, see Japanese Unexamined Patent Application Publication No. 2009-100118 (JP 2009-100118 A)).

A technique of retransmitting a packet at a time at which a retransmission timeout (RTO) of the ACK times out when a transmission-side terminal does not receive an acknowledgement (ACK) from a reception-side terminal even in a predetermined time after the transmission-side terminal has transmitted the packet using the TCP is known.

A technique of retransmitting packets quickly without waiting for the timeout of an RTO when a transmission-side terminal divides data of which transmission has been requested by an application or the like into a plurality of segments and sequentially transmits the packets including the divided segments without waiting for an ACK from a reception-side terminal is known (for example, see V. Jacobson, "Congestion Avoidance and Control," Computer Communication Review, vol. 18, no. 4, pp. 314-329, August 1988). This technique is referred to as fast retransmission or the like. In the fast retransmission, when packets from a transmission-side terminal are received, a reception-side terminal ascertains sequence numbers included in the received packets and returns an ACK to the last packet to be received in the correct order when there is a missed sequence number. When an ACK including the same sequence number is received continuously three times, the transmission-side terminal retransmits the missed packet. The reason why the transmission-side terminal does not retransmit the missed packet when the ACK is received the first time and the second time is that there is a relatively high likelihood that the order of arrival of packets at the reception-side terminal has simply changed.

SUMMARY

However, in the related art, when one of packets including three segments from the final segment among the segments into which data has been divided is unable to be received normally by the reception-side terminal, the fast retransmission is not possible. In this case, since the unreceived packet is not retransmitted until a predetermined RTO of the ACK times out, it takes a relatively long time to retransmit the packet.

The disclosure provides a technique capable of enhancing a probability of relatively fast retransmission.

A first aspect of the disclosure provides an information processing system including: a first information processing device including a transmission unit, the transmission unit being configured to transmit a dummy segment including dummy data, after sequentially transmitting transmission segments into which transmission data is divided; and a second information processing device configured to communicate with the first information processing device using a transmission control protocol, the second information processing device including a removal unit configured to remove the dummy segment and to set data including the transmission segments as the transmission data when the transmission segments and the dummy segment are received.

According to this configuration, the transmission-side information processing device transmits packets including transmission data and then transmits packets including dummy data. Accordingly, it is possible to enhance a probability of relatively fast retransmission.

In the first aspect, the transmission unit may be configured to transmit the dummy segment including dummy data with a size not depending on a maximum size of data which the transmission unit is able to transmit using one segment.

According to this configuration, the transmission-side information processing device transmits packets including transmission data and then transmits packets including dummy data with an arbitrary size. Accordingly, it is possible to curb consumption of bands of a network, for example, using dummy data with a relatively small size and to enhance a probability of relatively fast retransmission.

In the first aspect, the dummy data may include at least a part of the transmission data.

According to this configuration, the transmission-side information processing device retransmits predetermined transmission data as dummy data. Accordingly, for example, the reception-side information processing device can acquire the lost transmission segment from the dummy data without waiting for retransmission of the lost transmission segment.

In the first aspect, the dummy data may include the same data as a final segment of the transmission segments.

According to this configuration, the transmission-side information processing device retransmits a final segment in transmission data as dummy data. Accordingly, for example, the reception-side information processing device can acquire the final segment from the dummy data without waiting for retransmission of the lost final segment.

In the first aspect, the transmission unit may be configured to transmit three dummy segments.

According to this configuration, the transmission-side information processing device transmits three packets of dummy segments. Accordingly, even when a packet of a final segment in transmission data is lost, it is possible to satisfactorily perform fast retransmission of the TCP In the first aspect, the second information processing device may be configured to transmit an acknowledgement signal to the first information processing device whenever each transmission segment and each dummy segment are received by the second information processing device, the acknowledgement signal including identification information corresponding to a last transmission segment received in a correct order of reception by the second information processing device, and the first information processing device may be configured to transmit a transmission segment subsequent to the transmission segment corresponding to the identification information when the identification information corresponding to the same transmission segment is received a predetermined number of times.

A second aspect of the disclosure provides an information processing method including: causing a first information processing device to transmit a dummy segment including dummy data after sequentially transmitting, using a transmission control protocol, transmission segments into which transmission data is divided; and causing a second information processing device to remove the dummy segment and to set data including the transmission segments as the transmission data when the transmission segments and the dummy segment are received.

A third aspect of the disclosure provides a non-transitory storage medium storing a program, the program causing an information processing device to perform a method when the program is executed by the information processing device. The method includes: transmitting a dummy segment including dummy data after sequentially transmitting, using a transmission control protocol, transmission segments into which transmission data is divided; and removing the dummy segment and setting data including the transmission segments as the transmission data in the information processing device when the transmission segments and the dummy segment are received from another information processing device using the transmission control protocol.

A fourth aspect of the disclosure provides an information processing device configured to transmit a dummy segment including dummy data after sequentially transmitting, using a transmission control protocol, transmission segments into which transmission data is divided.

A fifth aspect of the disclosure provides an information processing device configured to remove a dummy segment and to set data including transmission segments as transmission data in another information processing device when the transmission segments and the dummy segment are received from the other information processing device using a transmission control protocol.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 4 is a sequence diagram illustrating an example of processes which are performed by the information processing system according to the embodiment;

FIG. 7 is a diagram illustrating an example in which real data is used as dummy data.

DETAILED DESCRIPTION OF EMBODIMENTS

Hereinafter, an embodiment of the disclosure will be described with reference to the accompanying drawings.

<System Configuration>

Figure 1:
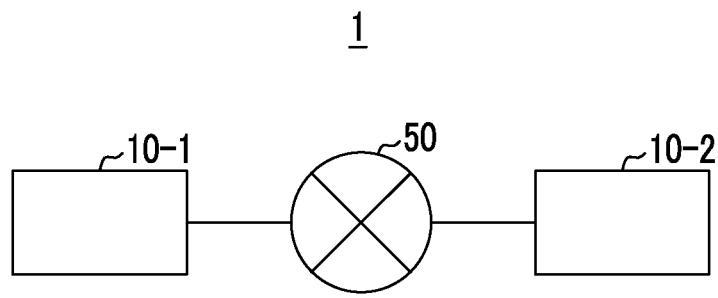
FIG. 1 is a diagram illustrating an example of a configuration of an information processing system according to an embodiment.

FIG. 1 is a diagram illustrating an example of a configuration of an information processing system 1 according to an embodiment. In FIG. 1, the information processing system 1 includes an information processing device 10-1 and an information processing device 10-2 (hereinafter simply referred to as an "information processing device 10" when they do not need to be distinguished from each other). The number of devices included in the information processing system 1 is not limited to two.

The information processing device 10-1 and the information processing device 10-2 are connected to each other via a network 50 such as an onboard local area network (LAN), a LAN, a wireless LAN, the Internet, or a mobile phone network such as Long Term Evolution (LTE) or 5th generation (5G).

In the following description, an onboard system in which onboard devices are connected to each other via an onboard LAN will be described as an example, but the disclosed technique can be applied to various devices in a device-control network system in a plant or the like or an Internet of things (IOT) system in which a sensor and the like are connected to a cloud or the like.

The information processing device 10-1 and the information processing device 10-2 are onboard devices such as a sensor and an onboard electronic control unit (ECU).

<Hardware Configuration>

Figure 2:
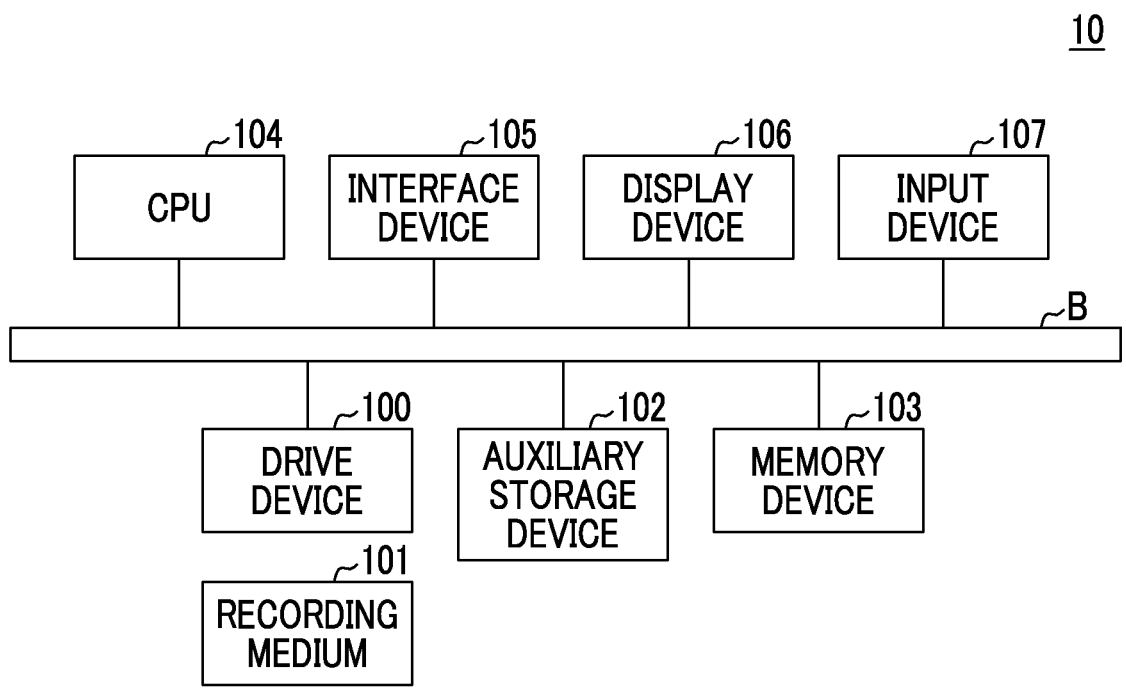
FIG. 2 is a diagram illustrating an example of a hardware configuration of an information processing device according to the embodiment.

FIG. 2 is a diagram illustrating an example of a hardware configuration of an information processing device 10 according to the embodiment. The information processing device 10 illustrated in FIG. 2 includes a drive device 100, an auxiliary storage device 102, a memory device 103, a CPU 104, an interface device 105, a display device 106, and an input device 107 which are connected to each other via a bus B.

An information processing program for realizing processes in the information processing device 10 is provided by, for example, a recording medium 101. When the recording medium 101 having an information processing program recorded thereon is set in the drive device 100, the information processing program is installed in the auxiliary storage device 102 from the recording medium 101 via the drive device 100. The information processing program does not need to be installed using the recording medium 101, but may be downloaded from another computer via a network. The auxiliary storage device 102 stores necessary files or data and the like in addition to the installed information processing program.

The memory device 103 is, for example, a random access memory (RAM), and reads and stores a program from the auxiliary storage device 102 when a program start instruction has been issued. The CPU 104 realizes functions associated with the information processing device 10 in accordance with the program stored in the memory device 103. The interface device 105 is used as an interface for connection to a network.

Examples of the recording medium 101 include portable recording media such as a CD-ROM, a DVD disc, and a USB memory. Examples of the auxiliary storage device 102 include a hard disk drive (HDD) and a flash memory. Both the recording medium 101 and the auxiliary storage device 102 correspond to a computer-readable recording medium.

<Functional Configuration>

Figure 3:
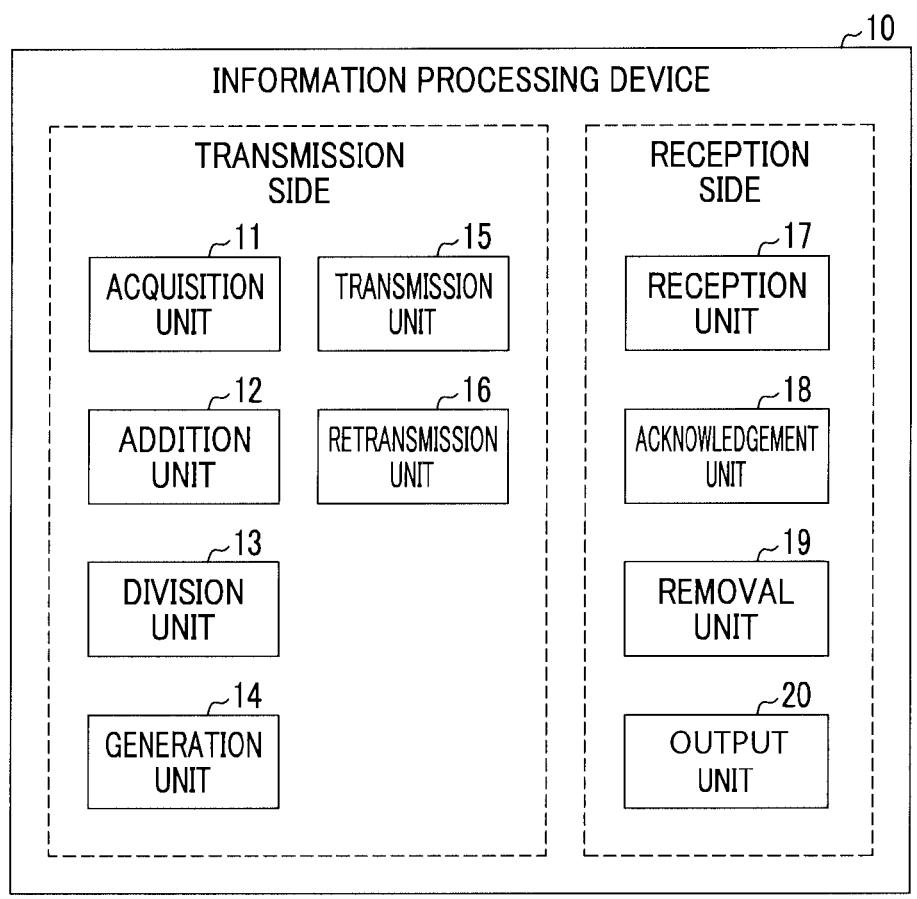
FIG. 3 is a diagram illustrating an example of a functional block diagram of the information processing device according to the embodiment.

A functional configuration of the information processing device 10 according to the embodiment will be described below with reference to FIG. 3. FIG. 3 is a diagram illustrating an example of a functional block diagram of the information processing device 10 according to the embodiment. The information processing device 10 includes an acquisition unit 11, an addition unit 12, a division unit 13, a generation unit 14, a transmission unit 15, a retransmission unit 16, a reception unit 17, an acknowledgement unit 18, a removal unit 19, and an output unit 20. The acquisition unit 11, the addition unit 12, the division unit 13, the generation unit 14, the transmission unit 15, the retransmission unit 16, the reception unit 17, the acknowledgement unit 18, the removal unit 19, and the output unit 20 represent functions which are realized by processes which one or more programs installed in the information processing device 10 cause the CPU 104 of the information processing device 10 to perform. The acquisition unit 11, the addition unit 12, the division unit 13, the generation unit 14, the transmission unit 15, and the retransmission unit 16 are transmission-side functional units. The reception unit 17, the acknowledgement unit 18, the removal unit 19, and the output unit 20 are reception-side functional units.

The acquisition unit 11 acquires real data to be transmitted (transmission data) from an application. The addition unit 12 adds dummy data to the real data acquired by the acquisition unit 11.

The division unit 13 divides data in which the dummy data has been added to the real data by the addition unit 12 into a plurality of segments. For example, the division unit 13 divides the data such that the size of each segment is equal to or less than a maximum size of TCP data which can be transmitted using one TCP packet, that is, a maximum size of data which can be transmitted using one segment (a maximum segment size (MSS)).

The generation unit 14 sequentially generates packets including the segments divided by the division unit 13. The transmission unit 15 sequentially transmits the packets generated by the generation unit 14 from the first segment to the final segment. That is, the transmission unit 15 transmits one or more packets ("a first packet") including real data and then transmits one or more packets ("a second packet") including dummy data.

When a predetermined number of acknowledgements of the same packet are received, the retransmission unit 16 retransmits the packet. For example, when the same ACK is received from the reception-side information processing device 10 three times using the fast retransmission function of the TCP, the retransmission unit 16 retransmits the TCP packet indicated by the ACK.

The reception unit 17 receives packets from another information processing device 10. When a packet including a segment later than one segment has been received while a packet including the one segment is not received by the reception unit 17, the acknowledgement unit 18 returns an acknowledgement of the one segment.

The removal unit 19 connects the segments received by the reception unit 17 in accordance with the order of segments and then removes the dummy data from the connected data. The removal unit 19 may remove the dummy data from the segments received by the reception unit 17 and then connect the segments from which the dummy data has been removed in accordance with the order of segments. The output unit 20 outputs data from which the dummy data has been removed by the removal unit 19 to the application.

<Processes>

Figure 5A:
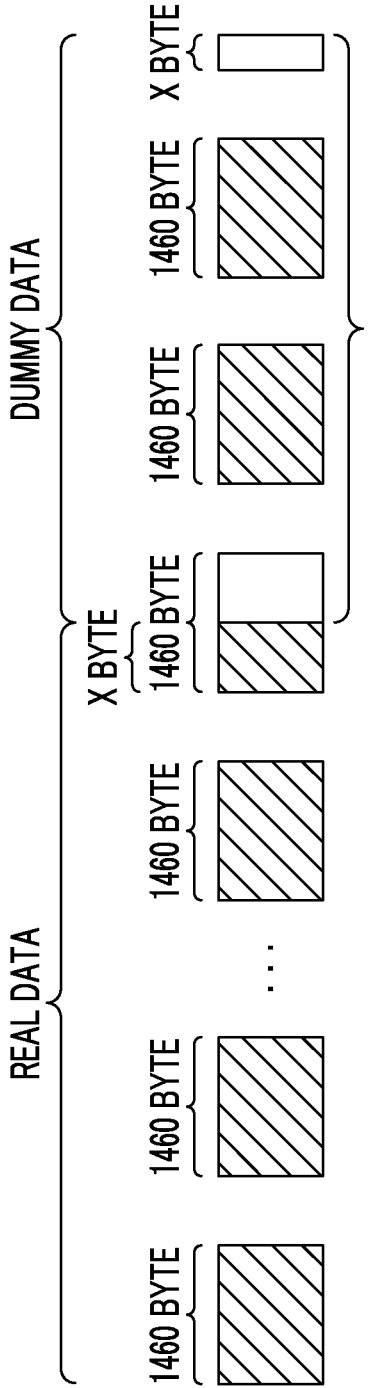
FIG. 5A is a diagram illustrating an example of a process of adding dummy data.
Figure 5B:
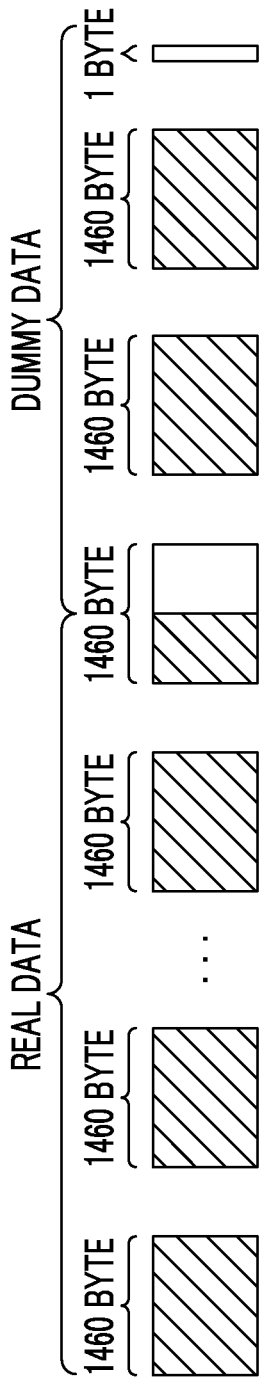
FIG. 5B is a diagram illustrating an example of a process of adding dummy data.
Figure 5C:
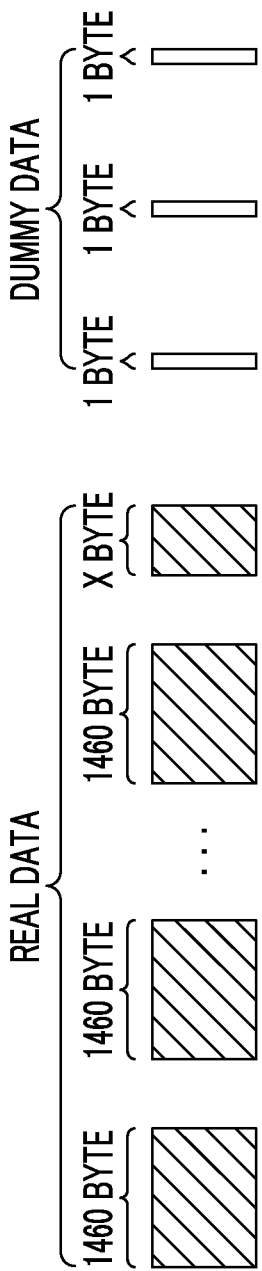
FIG. 5C is a diagram illustrating an example of a process of adding dummy data.

The processes which are performed by the information processing system 1 according to the embodiment will be described below with reference to FIG. 4 and FIGS. 5A to 5C. FIG. 4 is a sequence diagram illustrating an example of processes which are performed by the information processing system 1 according to the embodiment. FIGS. 5A to 5C are diagrams illustrating examples of a process of adding dummy data.

In Step S1, the acquisition unit 11 of the information processing device 10-1 acquires a transmission request including real data and a communication address of a destination from an application.

Subsequently, the addition unit 12 of the information processing device 10-1 adds dummy data which can be transmitted using three TCP packets to the real data included in the transmission request (Step S2). Here, the dummy data may be, for example, predetermined data which is set in advance between the information processing device 10-1 and the information processing device 10-2.

For example, it is assumed that the information processing device 10-1 and the information processing device 10-2 are connected via Ethernet (registered trademark), a payload in an Ethernet frame is 1500 bytes, an IP header in the payload is 20 bytes, and a TCP header in the payload is 20 bytes. In this case, the MSS is 1460 bytes (=1500 bytes−20 bytes−20 bytes). Accordingly, as illustrated in FIG. 5A, the addition unit 12 adds dummy data which can be transmitted using three TCP packets by adding dummy data of 4380 bytes.

As illustrated in FIG. 5B, the addition unit 12 may subtract a remainder after the number of bytes of real data is divided by the number of bytes of the MSS from 2920 (=1460×2) and then add dummy data of the number of bytes obtained by adding 1 thereto such that the TCP data included in the final TCP packet is 1 byte. In this case, for example, when the real data is 4480 bytes, dummy data of 2821 (=2920−(4480 mod 4380)+1) bytes can be added.

As illustrated in FIG. 5C, the addition unit 12 performs the addition such that the TCP data included in each TCP packet of three packets from the final packet including dummy data is 1 byte. In this case, for example, a TCP protocol stack may be mounted such that such dummy data is added.

Subsequently, the division unit 13 of the information processing device 10-1 sequentially divides the data in which the dummy data has been added to the real data into segments with a size equal to or smaller than the MSS from the head (Step S3).

Subsequently, the generation unit 14 of the information processing device 10-1 sequentially generates first to n-th TCP packets including the divided segments (Step S4). Here, three ((n−2)-th to n-th) TCP packets from the final packet include dummy data.

Subsequently, the transmission unit 15 of the information processing device 10-1 transmits the generated packets in the order of segments (Step S5). Here, a sequence number is included in a TCP header of each TCP packet. The reception side of the TCP packets can determine whether the currently received TCP packet has been received in the correct order based on the sequence number included in the previously received TCP packet, the number of bytes of the TCP data, and the sequence number included in the currently received TCP packet.

In the following description, it is assumed that the information processing device 10-2 receives the first to (n−4)-th TCP packets among the first to n-th TCP packets, and the (n−3)-th TCP packet is lost due to congestion or the like.

When the (n−4)-th TCP packet is received by the reception unit 17, the acknowledgement unit 18 of the information processing device 10-2 returns an acknowledgement of the (n−4)-th TCP packet (Step S6). Specifically, the acknowledgement unit 18 of the information processing device 10-2 returns an ACK including an ACK number which is obtained by adding the number of bytes of the TCP data included in the (n−4)-th TCP packet to the sequence number included in the (n−4)-th TCP packet. Based on this ACK, the information processing device 10-1 can determine that the (n−3)-th TCP packet is expected to be received the next time by the information processing device 10-2.

Subsequently, when the (n−2)-th TCP packet has been received while the (n−3)-th TCP packet has not been received, the acknowledgement unit 18 of the information processing device 10-2 returns an acknowledgement of the (n−4)-th TCP packet (Step S7). That is, the same ACK as the ACK transmitted in Step S6 is returned again.

Subsequently, when the (n−1)-th TCP packet has been received while the (n−3)-th TCP packet has not been received, the acknowledgement unit 18 of the information processing device 10-2 returns an acknowledgement of the (n−4)-th TCP packet (Step S8). That is, the same ACK as the ACK transmitted in Step S6 is returned three times.

The retransmission unit 16 of the information processing device 10-1 has received the ACK including the same ACK number three times, and thus subsequently retransmits the (n−3)-th TCP packet using the fast retransmission function (Step S9).

Subsequently, the removal unit 19 of the information processing device 10-2 sequentially connects the segments included in the received TCP packets and then removes the dummy data from the data (Step S10).

Subsequently, the output unit 20 of the information processing device 10-2 outputs reception data from which the dummy data has been removed to the application of the information processing device 10-2 (Step S11). Accordingly, the application of the information processing device 10-2 can receive transmission data from the application of the information processing device 10-1.

When TCP packets have been received in the correct order, the information processing device 10-2 may return an ACK of the received TCP packet whenever a TCP packet is received from the information processing device 10-1. Alternatively, the information processing device 10-2 may return one ACK of a plurality of received TCP packets.

<Advantages>

Figure 6:
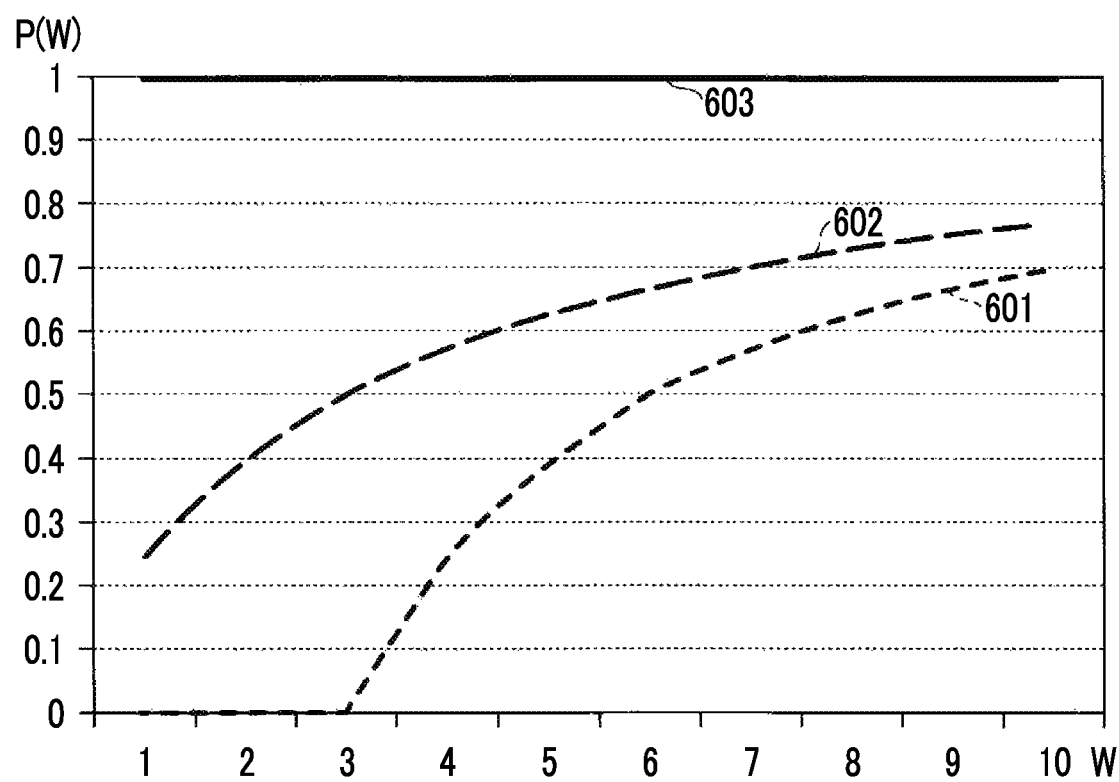
FIG. 6 is a diagram illustrating advantages of the information processing system according to the embodiment.

Advantages of the information processing system 1 according to the embodiment will be described below with reference to FIG. 6. FIG. 6 is a diagram illustrating advantages of the information processing system 1 according to the embodiment.

When the number of packets which are transmitted at a time is defined as W, a probability P(W) of retransmission by the fast retransmission function and a probability Q(W) of retransmission due to timeout of the RTO of an ACK when a packet is lost can be calculated by the following equations.

$$P(W) = \max(1 - 3/W, 0) \quad (1)$$

$$Q(W) = \min(1, 3/W) \quad (2)$$

A curve 601 in FIG. 6 is a line representing a relationship between W and P(W) in the related art in which dummy data is not added. In the related art, when W is equal to or less than 3, fast retransmission is not performed even when packet loss occurs.

A curve 602 in FIG. 6 is a line representing a relationship between W and P(W) when three packets of dummy data are added in the above-mentioned embodiment. In the embodiment, fast retransmission of a packet including only dummy data is not performed even when packet loss occurs.

A line 603 in FIG. 6 is a line representing a relationship between W and P(W) for real data when three packets of dummy data are added in the above-mentioned embodiment. As indicated by the line 603 in FIG. 6, when three packets of dummy data are added, fast retransmission of a packet including real data is necessarily performed when packet loss occurs. In a case in which dummy data greater than three packets is added, fast retransmission of a packet including real data is performed when packet loss occurs. When one packet of dummy data or two packets of dummy data are added, P(W) is higher than in the related art and thus a packet can be retransmitted in a shorter time than the RTO of the ACK.

<Modified Example of Dummy Data>

In the above-mentioned embodiment, an example in which data not related to real data is used as dummy data has been described. Instead, real data may be used as dummy data.

FIG. 7 is a diagram illustrating an example in which real data is used as dummy data. As illustrated in FIG. 7, for example, after real data has been divided into segments and transmitted, TCP packets including three segments from the final segment are transmitted as dummy data. Accordingly, as illustrated in FIG. 7, after real data has been divided into first to k-th segments and transmitted, the (k−2)-th, (k−1)-th, and k-th segments are retransmitted. In this case, a flag indicating dummy data may be added to three segments from the final segment which are retransmitted as dummy data.

When the TCP packets including three segments from the final segment of the real data have been received normally, the reception side determines that the three segments from the final segment among the received TCP packets are dummy data and removes (discards) the dummy data.

When one or more of the TCP packets including three segments from the final segment of the real data are lost, the reception side performs, for example, the following process by mounting of the protocol stack of the TCP. First, it is determined whether a TCP packet including a segment which is not received due to packet loss has been received as dummy data. When such a TCP packet has been received, the segment is acquired from the dummy data and data in which the received segments are connected is sent to the application. When a lost TCP packet is retransmitted, the TCP packet is discarded. Accordingly, even when packet loss occurs, it is possible to acquire data faster.

Instead of transmitting the TCP packets including three segments from the final segment as dummy data, TCP packets including arbitrary segments may be transmitted as dummy data. In this case, a flag indicating dummy data and data indicating the ordinal number of the segment may be added to each segment which is retransmitted as dummy data.

<Modified Example>

In the above-mentioned embodiment, the TCP is used, but the disclosed technique is not limited to the TCP and a protocol for performing retransmission when the same ACK or negative acknowledgement (NACK) is received a predetermined number of times can be used.

<Conclusion>

A controller area network (CAN) which is a standard used for transmission of data between devices connected to each other is known in the related art. A CAN is used for transmission of control information of devices in a vehicle, a plant, or the like. A maximum value of a payload of a CAN is, for example, 8 bytes (64 bits).

On the other hand, in Ethernet (registered trademark), the maximum value of a payload is, for example, 1500 bytes and the size of data which can be transmitted using one packet is relatively large. In a device connected to a CAN in the related art, the size of data which is transmitted at a time is relatively small. Accordingly, when the device is connected to Ethernet, data which is transmitted from the device may be transmitted using a relatively small number of packets. Accordingly, even when the packets undergo packet loss, fast retransmission is not often performed.

According to the above-mentioned embodiment, the transmission-side information processing device transmits packets including real data and then transmits packets including dummy data. When an ACK of one packet including the real data is received a predetermined number of times, the packet is retransmitted. Accordingly, it is possible to enhance a probability of relatively fast retransmission.

While an embodiment of the disclosure has been described above, the disclosure is not limited to such a specific embodiment and can be modified and changed in various forms without departing from the gist of the disclosure described in the appended claims.

The functional units of the information processing device 10 may be embodied, for example, by cloud computing including one or more computers.

The functions of adding and removing dummy data may be mounted in a program for communication in a layer such as an application layer. Alternatively, such functions may be mounted in a program (a protocol stack) for communication in a layer such as a transport layer. In this case, the program may be bundled in an operating system (OS) and installed in the information processing device 10.

What is claimed is:

1. An information processing system comprising:
    a first information processing device including a transmission unit, the transmission unit being configured to transmit a dummy segment including dummy data, after sequentially transmitting transmission segments into which transmission data is divided; and
    a second information processing device configured to communicate with the first information processing device using a transmission control protocol, the second information processing device including a removal unit configured to remove the dummy segment and to set data including the transmission segments as the transmission data when the transmission segments and the dummy segment are received, wherein
    the second information processing device is configured to transmit an acknowledgement signal to the first information processing device whenever each transmission segment and each dummy segment are received by the second information processing device, the acknowledgement signal including identification information corresponding to a last transmission segment received in a correct order of reception by the second information processing device, and
    the first information processing device is configured to transmit a transmission segment subsequent to the transmission segment corresponding to the identification information when the identification information corresponding to the same transmission segment is received a predetermined number of times.

2. The information processing system according to claim 1, wherein
    the transmission unit is configured to transmit the dummy segment including dummy data with a size not depending on a maximum size of data which the transmission unit is able to transmit using one segment.

3. The information processing system according to claim 1, wherein
    the dummy data includes at least a part of the transmission data.

4. The information processing system according to claim 1, wherein
    the dummy data includes the same data as a final segment of the transmission segments.

5. The information processing system according to claim 1, wherein
    the transmission unit is configured to transmit three dummy segments.

6. An information processing method comprising:
    (a) causing a first information processing device to transmit a dummy segment including dummy data after sequentially transmitting, using a transmission control protocol, transmission segments into which transmission data is divided;
    (b) causing a second information processing device to remove the dummy segment and to set data including the transmission segments as the transmission data when the transmission segments and the dummy segment are received;
    (c) causing the second information processing device to transmit an acknowledgement signal to the first information processing device whenever each transmission segment and each dummy segment are received by the second information processing device, the acknowledgement signal including identification information corresponding to a last transmission segment received in a correct order of reception by the second information processing device; and
    (d) causing the first information processing device to transmit a transmission segment subsequent to the transmission segment corresponding to the identification information when the identification information corresponding to the same transmission segment is received a predetermined number of times.

7. The information processing method according to claim 6, wherein
    the step of includes causing the first information processing unit to transmit the dummy segment including dummy data with a size not depending on a maximum size of data which is able to be transmitted using one segment.

8. The information processing method according to claim 6, wherein
    the dummy data includes at least a part of the transmission data.

9. The information processing method according to claim 6, wherein
    the dummy data includes the same data as a final segment of the transmission segments.

10. The information processing method according to claim 6, wherein
    the step of includes causing the first information processing device to transmit three dummy segments.

11. A non-transitory storage medium storing a program, the program causing an information processing device to perform a method when the program is executed by the information processing device, the method comprising:
(a) transmitting a dummy segment including dummy data after sequentially transmitting, using a transmission control protocol, transmission segments into which transmission data is divided; and
(b) removing the dummy segment and setting data including the transmission segments as the transmission data in the information processing device when the transmission segments and the dummy segment are received from another information processing device using the transmission control protocol, wherein
the another information processing device is configured to transmit an acknowledgement signal to the information processing device whenever each transmission segment and each dummy segment are received by the another information processing device, the acknowledgement signal including identification information corresponding to a last transmission segment received in a correct order of reception by the another information processing device, and
the information processing device is configured to transmit a transmission segment subsequent to the transmission segment corresponding to the identification information when the identification information corresponding to the same transmission segment is received a predetermined number of times.

* * * * *